United States Patent [19]

Noble

[11] Patent Number: 5,577,429
[45] Date of Patent: Nov. 26, 1996

[54] ADJUSTABLE TABLE FOR CUTTING

[76] Inventor: Walter E. Noble, 69 Prennan Avenue, Islington, Ontario, Canada, M9B 4C2

[21] Appl. No.: 265,359

[22] Filed: Jun. 24, 1994

[51] Int. Cl.$^6$ .............................. B27B 5/20; B27B 9/04
[52] U.S. Cl. .................. 83/468.4; 83/471.3; 83/477.1; 83/478; 83/486.1; 83/522.19; 83/581; 83/574
[58] Field of Search ............................ 83/468.1, 471.2, 83/471.3, 472, 473, 477, 477.1, 478, 486, 486.1, 522.18, 522.19, 468.4, 574, 581

[56] References Cited

U.S. PATENT DOCUMENTS

| | | | |
|---|---|---|---|
| 2,656,860 | 10/1953 | Thayer | 83/471.3 X |
| 3,866,496 | 2/1975 | Payne et al. | 83/471.3 |
| 4,516,453 | 5/1985 | Parham, Jr. | 83/486.1 X |

*Primary Examiner*—Rinaldi I. Rada
*Assistant Examiner*—Raymond D. Woods
*Attorney, Agent, or Firm*—Kenneth M. Garrett

[57] ABSTRACT

An elongated cutting table has a guide bar assembly pivotally connected thereto which is rotatable to change the cutting angle. The pivoting arrangement acts to retain a fixed point adjacent the rearward side of the table on the cutting path defined by the guide bar assembly at all times, while retaining a forward edge of the table in proximity to a safety shield disposed on the guide bar assembly forwardly of the forward edge. The cutting table is particularly adapted for use in sawing long, thin work such as siding.

17 Claims, 4 Drawing Sheets

5,577,429

ADJUSTABLE TABLE FOR CUTTING

FIELD OF THE INVENTION

This invention is specifically described in relation to an adjustable table for use cutting using a power circular saw, but it may be used with other cutting tools.

BACKGROUND OF THE INVENTION

In my U.S. Pat. Nos. 4,909,111 and 5,090,283 I describe a saw table that adapts normally portable circular saws for use in cutting with the heel of the saw blade. This table is used primarily for cutting wooden trim lumber but is also used in the trade for cutting siding for houses, which siding, particularly where made of poly vinyl chloride, tends to shatter when cut with a forward part of the saw blade.

The width of commercial siding does not normally exceed 30 cm. (12 in.). Where the siding must be cut to conform to a gable end of a house, for example, the angle of cut required may be quite small eg. 14°, corresponding to a roof pitch of 3 in 12. The length of cut at this angle, assuming the width of the siding to be 30 cm. is approximately 120 cm. (48 in.), and considering that the saw blade is required to clear both edges of the siding when making the cut, the length of travel of the saw will be approximately 150 cm. (60 in.). While a saw table constructed in accordance with my above patents has been made sufficiently large to accommodate this length of cut, this has some disadvantages.

In U.S. Pat. No. 3,872,755, a saw table is described in which a long guide bar assembly is mounted from the cutting table. The guide bar assembly comprises long guide bars which are mounted transversely above the table deck at their ends on a beam which is fastened to the underside of the table with a vertical pivot bolt. In order to stabilize the beam relative to the table, the pivot bolt is placed towards the middle of the table. The cutting fence of the table is generally located adjacent the back edge of the table; accordingly, when the guide bar assembly is rotated, the point of intersection of the cutting path of the blade of the saw with the fence line of the table moves. This requires that a measuring tape zeroed at the point of intersection be adjusted each time the angle of rotation of the guide bar assembly is changed relative to the table, in order to facilitate the correct positioning of the work to be cut on the table. If the cut is to be made with the heel of the blade by pulling the saw backwards, the guard of the saw must be raised to expose the saw blade. When the narrow guide bar assembly is rotated so as to be in a position at or near right angles to the cutting path of the saw, the saw can be moved past the table for a significant distance. If the guard were retracted to cut in the backward pulling mode, the exposed blade would create a significant operator hazard.

In another commercial adjustable table design, the top of the beam is flush with the cutting surface and is flush with the deck, and helps to support the work to be cut when the table is generally at right angles to the cutting path of the saw. The table deck is thus bisected by the beam and consists of two sliding sections. As the beam is moved to acute cutting angles, these deck sections must spread apart so that increasingly wide gaps are created between the deck surfaces and the cutting beam surface so that support for the workpiece is not continuous. And again, measuring tapes installed in fence pieces or decks must be rezeroed after each change of angle.

SUMMARY OF THE INVENTION

It is an object of my invention to provide a practical table for cutting long, narrow work such as siding, which may be readily adjusted to make angles of cut between 90° and relatively acute angles.

It is still another object of my invention to provide an adjustable saw table of the foregoing type with the ability to pull the saw backward to cut the heel of the blade with increased safety.

It is still another object of my invention to provide a saw table of the foregoing type with improved portability and reduced shipping cost.

It is yet another object of my invention to provide an adjustable saw table of the foregoing type of reduced weight with adequate rigidity.

It is another object of my invention to provide an adjustable cutting table wherein the point of intersection of the fence line of the table and the cutting path of a blade does not vary with the cutting angle to which the table is adjusted, so that a measuring tape fixed in one location can function.

In accordance with one aspect of my invention, a device for supporting an article for cutting comprises a bed having a first axially extending track means therealong and a fixed point spaced apart from the track means defining a bed pivot axis. A cutting table is disposed above the bed; the table has a fence line for positioning the article to be cut using a cutting tool supported from the bed while travelling along an axial cutting path above the table, the point of intersection of the fence line and the cutting path defining a table pivot axis. A second track means is secured to the cutting table, preferably adjacent a longitudinal edge thereof opposed to the fence line. A first track runner is provided for relative movement along the first track means, and a second track runner for relative movement along the second track means. Each track runner has a vertical pivot axis on which the track runners respectively connect to the table at the table pivot axis and to the bed at the bed pivot axis to permit relative rotation between the bed and the cutting table.

Assuming that a force is applied to rotate the bed so as to change the angle of intersection of the cutting path with the fence line, ie. to change the cutting angle to which the device is adjusted, a reactive force will be generated at the first and second track runners, causing a relative movement between the track runners and their respective tracks, and the locus of movement of any point of the table will be acircular. The first and second track means and their associated track runners serve to maintain the table pivot axis on the cutting path as the cutting angle is changed.

The arrangement permits the center of gravity of the bed and the associated cutting tool support structure to be contained within the confines of the two long sides of the table throughout the desired range of adjustment of the cutting angle, thereby avoiding any unbalancing of the device as a whole, while at all times maintaining a constant point of intersection between the fence line and the cutting path of the cutting tool. This permits measuring tapes to be mounted along the fence line extending outwardly from line of cut and always zeroed thereon notwithstanding the adjustment of the cutting angle.

Preferably, the device includes a third track means disposed on the bed and a fourth track means associated with the cutting table, and a third track runner which interconnects the third track means and the fourth track means, the third track runner being relatively moveable with respect to both the third and the fourth track means, and having a vertical axis about which relative rotational movement is permitted. The arrangement provides three points of attachment of the cutting table to the bed within which the geometric center of the bed may be disposed, and is accordingly relatively stable, notwithstanding the fact that both the bed and the cutting table may be long and narrow, and permits the bed to be of significantly lighter construction than in the prior art single bolt arrangements.

Suitably, the first and third track means are collinear, as are the and fourth track means. Also suitably and preferably, the second and fourth track means extend along the side of the cutting table opposed to the fence, which may otherwise be referred to as the forward side of the cutting table. Accordingly, the forward side of the cutting table is always maintained in proximity to the fixed point on the bed. This is advantageous, as it permits a fixed cutting blade shield to be disposed between the bed and guide bars which are disposed in a plane above the cutting table and along which a saw or other cutting tool is moved. This fixed cutting blade shield may extend from adjacent the fixed point to the forward end of the bed, so reducing operator hazard. This blade shield may be secured to both the guide bar and the bed, thereby serving to reinforce the guide bar along a substantial portion of its length and thereby reduce the problem of resilient deformation of the guide bars. Resilient deformation may be still further decreased by disposing a similar blade shield in diagonally opposite relationship to the first described blade shield. Additionally, the channels of the guide bar and a saw support plate, for example, which is disposed therein to be slidable therealong may be cooperatively configured with lips that coact to prevent the removal of the plate from the guide bars in a lateral direction.

The foregoing objects and aspects of my invention will be further described, together with other objects and aspects, in relation to a preferred embodiment of my invention taken in conjunction with the accompanying drawings.

DESCRIPTION OF THE PREFERRED EMBODIMENT

Figure 1:
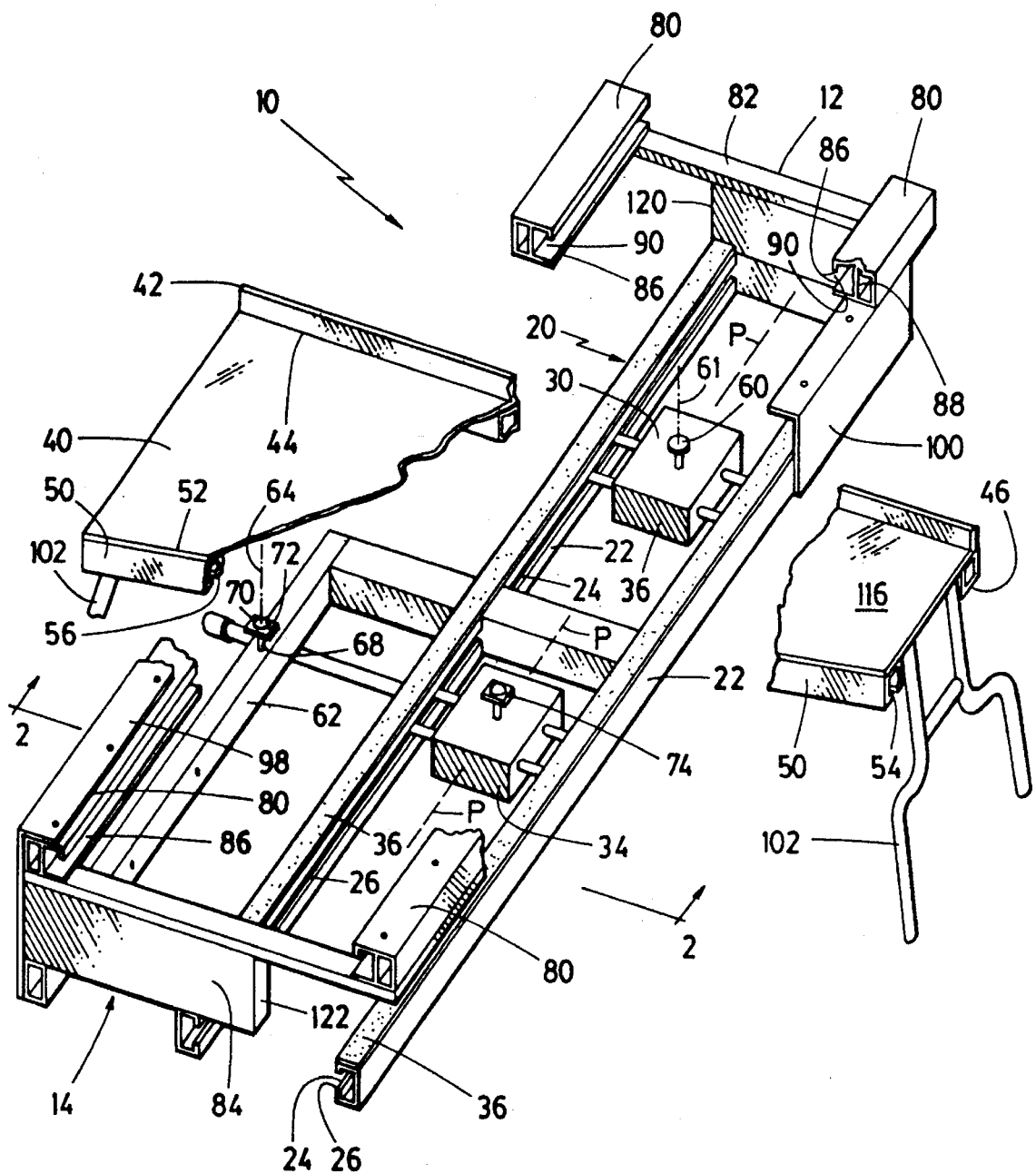
FIG. 1 shows in perspective view from the front, right hand side a saw table in accordance with the invention, broken away to reveal detail.
Figure 2:
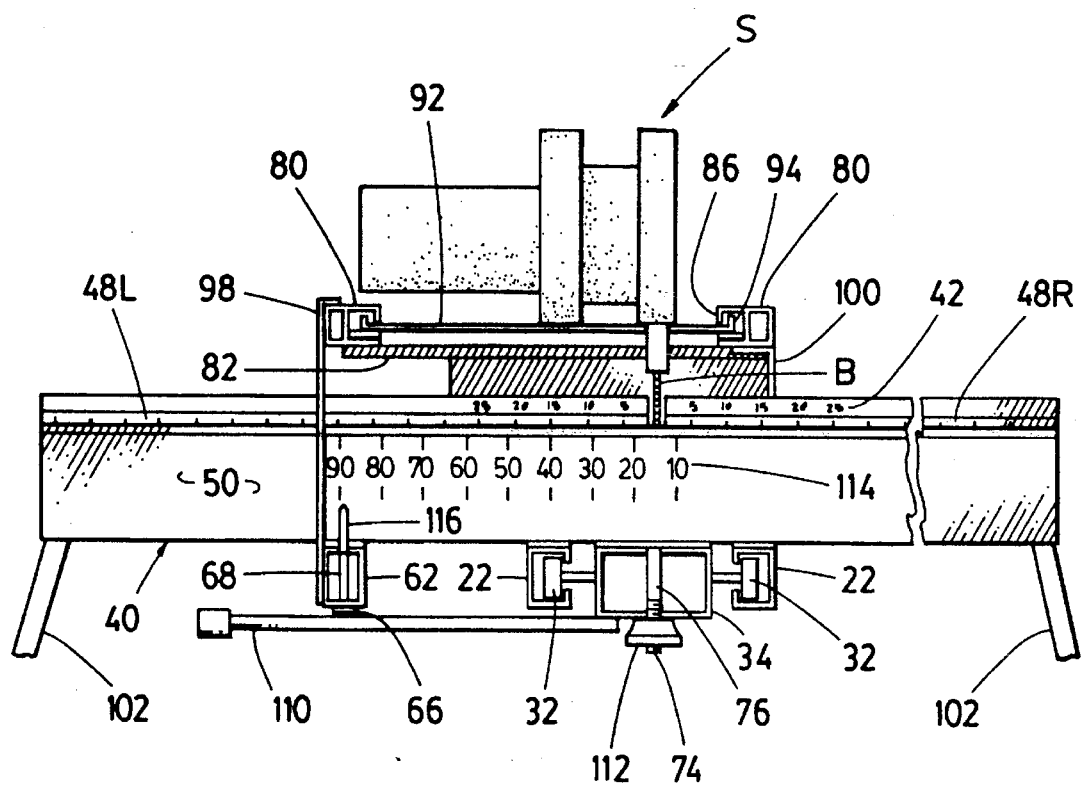
FIG. 2 is an elevation on line 2—2 of FIG. 1.

Referring to the drawings in detail, a saw table constructed in accordance with my invention is identified generally therein by the numeral 10. Saw table 10 includes a guide bar assembly 11, which, as oriented in FIG. 1, has a rearward end 12 locating at the top of the page and a notional axis extending from the rearward end to the forward end 14. Guide bar assembly 11 comprises a bed 20 which includes a pair of axially extending beams 22 each having a C-shaped cross section and a slot 24 therealong, the opposed slots forming a track 26 One or more stiffening cross-braces 28 strengthen bed 20. A car 30 is mounted in track 26 in rearward portions of the track to be rollable therealong on wheels 32. A second similar car 34 is mounted from forward portions of the track. Beams 22 are each provided on their upper surface with a friction reducing laminate layer 36, which layers are in coplanar relationship.

Saw table 10 also comprises a cutting table 40. Suitably, cutting table 40 has a length which is approximately equal to the axial length of bed 20 which may typically be approximately 180 cm (6 ft.). Also suitably, cutting table 40 may have a front to back depth of approximately 48 cm (19 in) at the left hand end thereof (as viewed in FIG. 1) which decreases uniformly towards the right hand end to about 30 cm. (12 in.) at the right hand end for a purpose to be described. A fence 42 is upstanding from cutting table 40 along the rearward edge thereof, the intersection of the fence and the cutting table defining a notional fence line 44. A reinforcing beam 46 is disposed beneath fence 42 to stiffen table 40. A second reinforcing beam 50 is disposed beneath table 40 extending lengthwise adjacent the forward side 52 thereof. Beam 50 has a hollow section with a slotted opening 54 therealong forming a second track 56.

Cutting table 40 is secured to bed 20 at three points, the first of which is generally fixed relative to the cutting table and moveable axially along track 26, and the securement comprises a swivel bolt 60 which is attached at one end thereof to the rearward car 30 and at the other end to cutting table 40 at fence line 44 intermediate the ends of the cutting table, to define a table pivot axis 61. The second point of securement is fixed relative to bed 20 and moveable with respect to the cutting table 40. The fixed point on the bed 20, otherwise referred to as the bed pivot axis 64, will locate in laterally spaced relationship to table pivot 61 on the operator side thereof, which will normally be the left hand side, of cutting table 40, and conveniently at a distance from the forward end 14 of the bed 20 equal to approximately one third of the axial length of the bed. Conveniently, bed 20 includes a beam 62 on which the bed pivot axis 64 is disposed. A bolt 66 having a shank 68 passing through slotted opening 54 defining track 56 and a head 70 captured within the track so as to be slidable therealong is secured to beam 62 concentered on pivot axis 64. An anti-friction layer 72 is disposed beneath head 70 to facilitate the relative movement of the bolt head and track 56. The third point of securement of cutting table 40 to bed 20 is moveable with respect to both the cutting table and the bed, and comprises a bolt 74 generally identical to bolt 66, and having its head similarly captured in track 56. The shank 76 of the bolt 74 is threaded and is secured to forward car 34 so as to be slidable along the axis of the bolt.

Guide bar assembly 11 further comprises a pair of axially aligned guide bars 80 disposed above cutting table 40 on end supports 82, 84 located at the respective axial ends of bed 20. Guide bars 80 are each provided with a slotted opening 86 therealong and suitably have a C shaped cross-section, preferably stiffened by one or more internal walls 88. The opposed slotted openings 86 of guide bars 80 together form a track 90 in which is engaged a plate 92, which may be the sole plate of a circular saw shown in outline and identified by the letter S, or an auxiliary sole plate to which the sole plate of the circular saw may be clamped so as to provide a lateral adjustment of the cutting path P along which the blade B of the saw S will travel as the saw is moved along track 90. Preferably plate 92 is provided with an upturned lip 94 along each lateral edge thereof, and slotted openings 86 of the guide bars 80 with a downturned lip 96 which will coact with the upturned lip of the plate to prevent the plate from being inadvertently detached from track 90 by the resilient springing action of guide bars 80. Such springing action is curtailed in part by a first reinforcing shield 98 which connects between bed 20 forwardly of fixed point 64 and the left hand guide bar 80, and a further reinforcing shield 100 which connects between the right hand guide bar 80 and bed 20 adjacent the rearward end 12 of bed 20. The axial length of shields 98 and 100 will be apparent from the ensuing description of the operation of saw table 10.

Figure 3:
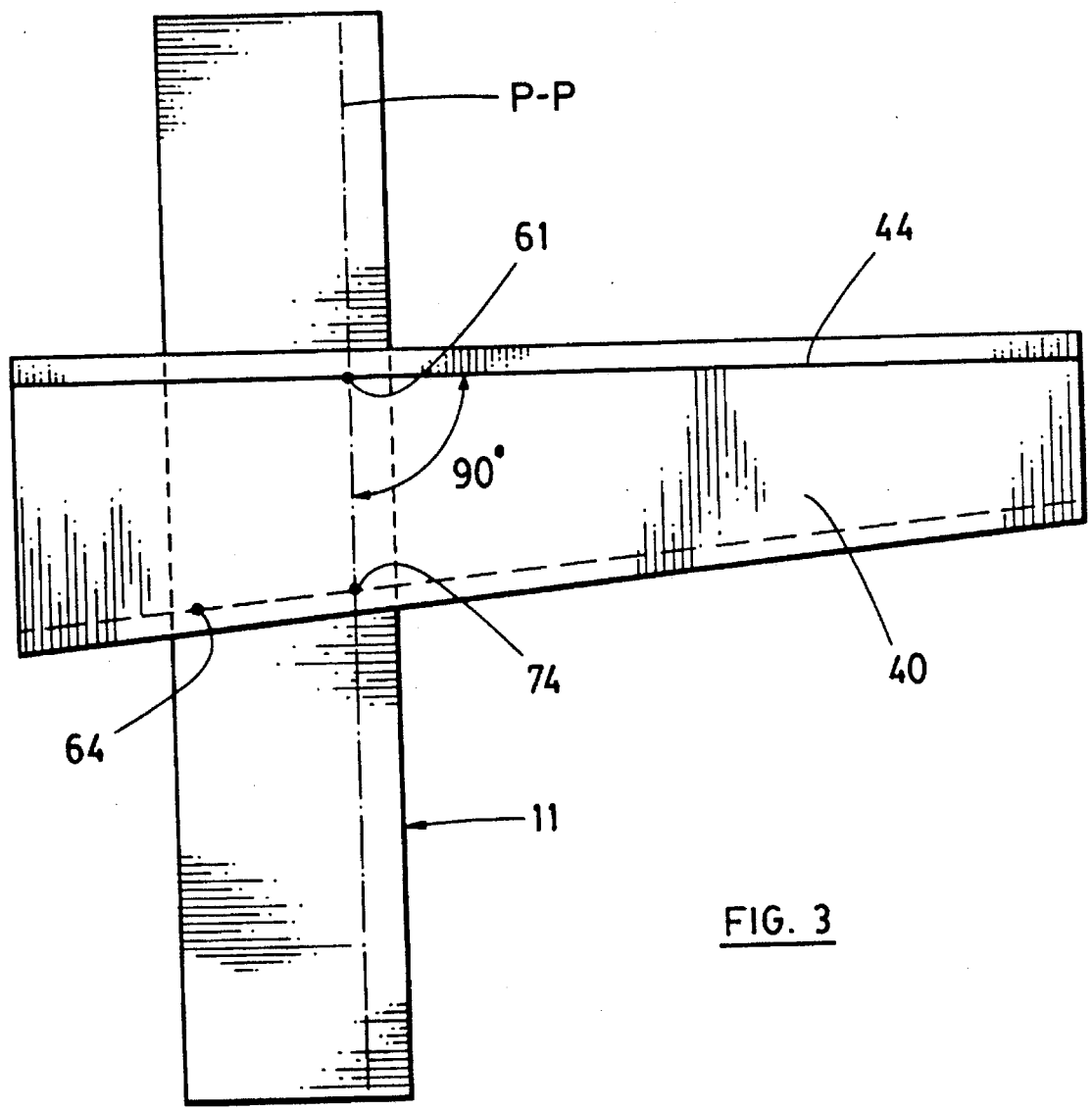
FIG. 3 & 4 are schematic plan views of the saw table respectively adjusted to adjacent opposed limits of the cutting angle.
Figure 4:
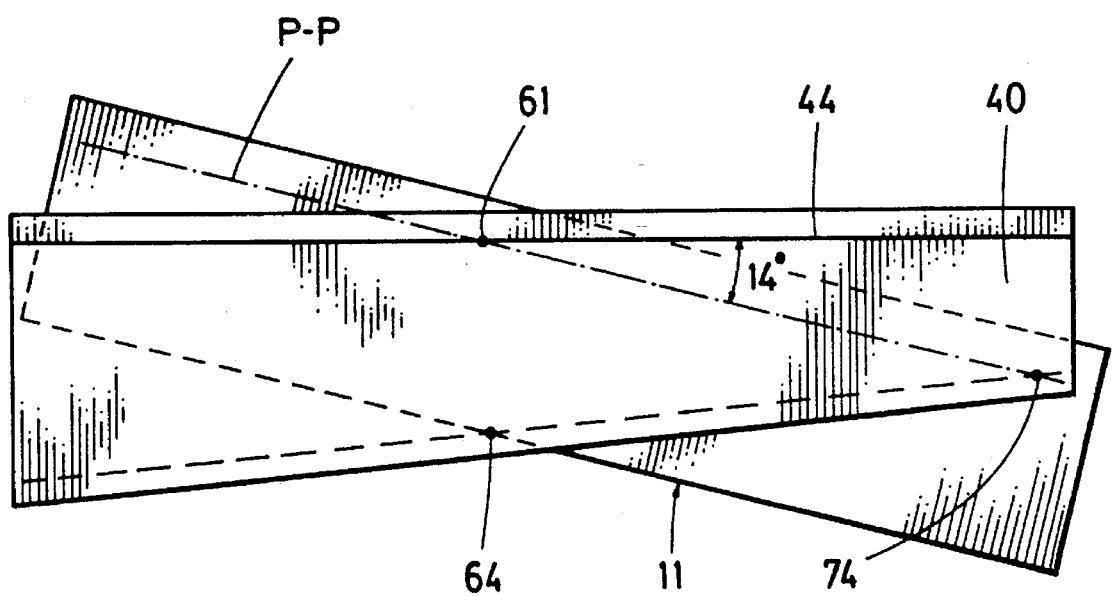

Saw table 10 is set up with circular saw S such that the cutting path P of blade B intersects fence line 44 at the axis of bolt 60, ie. at the table pivot axis 61. Measuring tapes 48L, 48R zeroed on the cutting path extend outwardly on fence 42. Generally speaking, saw table 10 will include legs 102 hingedly connected to opposed ends of cutting table 40 from which the saw table as a whole is supported. As guide bar assembly 11 is rotated on bolt 60 in an anti-clockwise direction from the position shown in FIG. 1, track 56 will slide along bolt 66 and pivot therearound. Correspondingly, car 30 will travel along track 26. Track 56 will also move in a sliding, pivoting action relative to bolt 74, which will cause car 34 to move along track 26. In practise, with the geometry approximating that illustrated, for any degree of angular movement of cutting table 40 the linear movement of car 34 will exceed both the linear movement of car 30 and the linear movement of bolt 66 relative to track 56. It is found that it is easiest to promote rotational movement of the guide bar assembly 11 by exerting a force directly on car 34 to cause it to move forwardly or rearwardly as desired, and for this purpose car 34 is provided with a handle 110 extending to the lateral side of the saw table 10 on which an operator will normally be positioned. Guide bar assembly 11 is conveniently locked in any position of adjustment of the cutting angle by means of a knob 112 which is threadably connected to bolt 74, the tightening action of which urges cutting table 40 into firm contact with bed 20. At all positions of rotation of guide bar assembly 11 between a first position, as seen in FIGS. 1 and 3, wherein fence line 44 is at right angles to cutting path P and a second position seen in FIG. 4 at which the fence line intersects the cutting path at an angle of about 14°, the forward side of the cutting table 40 defined by beam 50 will be closely adjacent to the rearward end of the cutting blade shield 98. Accordingly, when saw S is positioned on guide bars 80 forwardly of cutting table 40 with the blade guard of the saw retracted, as may arise when cutting with the heel of the saw blade, the fixed blade shield will reduce the possibility of an operator making inadvertent contact with the saw blade. Reference may be had to my above identified patents for suitable means for retracting the blade guard of saw S.

The proximity of the bed pivot axis 64 to the forward side 52 of cutting table 40 and to the reinforcing beam portion 50 throughout the course of travel of the guide bar assembly 11 permits the forward side and/or the beam to be used to determine the degree of rotation of the cutting table, and for this purpose a protractor scale 114 is carried on the forward side 52, and a pointer 116 mounted from bed 20 in axial alignment with bed pivot 64.

As indicated earlier, it is desirable that guide bar assembly 11 be rotatable to permit siding to be cut at any angle between 90° and about 14°. When guide bar assembly 11 is rotated towards the low end of its range, the rearward side of the cutting table ie. the side along which fence 42 is disposed, tends to impeded the passage of rearward end support 82, while the forward side 52 of the cutting table tends to impeded the travel of forward support 84. This latter impediment is generally overcome by reducing the width of the cutting table at right hand end 116 thereof, ie. that end which is remote from a normally positioned operator. These impediments to the travel of the guide bar assembly 11 are overcome by cantilevering rearward end support 82 to provide a lacuna 120, and by similarly cantilevering end support 84 at the forward end of bed 20, although from laterally opposed side of bed 20, to provide a lacuna 122 which permits a long, relatively wide work piece to be placed on the cutting table 40. Saw table 10 having dimensions approximately those given above will when knocked down have a combined girth and length of not more than 3.3 m. (130 cm.), which is an important factor in the distribution of articles by common carrier.

It will be apparent that many changes may be made to the illustrative embodiment while falling within the scope of the invention, and it is intended that all such changes be covered by the claims appended hereto.

I claim:

1. A device for supporting an article for cutting comprising a bed having a first elongated track means having an axis therealong and a fixed support point defining a bed pivot axis;

a cutting table disposed above said bed, said cutting table having a fence line for positioning said article when placed on said table for cutting with a cutting tool supported from said bed for travelling along a cutting path extending parallel to said axis of said first track means above said table, said fence line and cutting path intersecting in a vertical line defining a table pivot axis;

a second track means secured to said cutting table;

a first track runner disposed for relative movement along said first track means;

a second track runner disposed for relative movement along said second track means;

each said first and second track runner having a vertical axis on which said track runners connect respectively to said cutting table at said table pivot axis and said bed at said bed pivot axis to permit relative rotation of said cutting table and said bed about said pivot axes;

said first and second track means and their associated track runners serving to maintain said vertical axis of said first track runner on said cutting path as said bed is rotated relative to said cutting table to change the angle at which said cutting path intersects said fence line;

the locus of any point on said cutting table relative to said bed being acircular as said bed and cutting table are relatively rotated.

2. A device as defined in claim 1 including a third track means disposed on said bed;

fourth track means disposed on said cutting table, and a third track runner interconnecting said third track means and said fourth track means for relative movement along both said third track means and said fourth track means.

3. A device as defined in claim 2 wherein said first and said third track means are collinear and said second and said fourth track means are collinear.

4. A device as defined in claim 2 wherein said second and fourth track means form one unitary track means extending along said cutting table adjacent one edge thereof opposed to said fence line.

5. A device as defined in claim 2 wherein said first track runner and said third track runner where said third track runner connects to said third track means each comprise cars which roll along the respective track means.

6. A device as defined in claim 2 wherein said second track runner, and said third track runner where said third track runner connects to said fourth track means, each slide along the respective track means.

7. A device as defined in claim 2 wherein said third track runner includes a car moveable along said third track means and wherein a handle means is rigidly attached to said car to extend laterally outwardly beyond said bed on a lateral side thereof adjacent to said fixed point.

8. A device as defined in claim 2 wherein releasable means is provided for releasably locking the relative rotational position of said cutting table and said bed.

9. A device as defined in claim 1 wherein said bed includes rearward and forward axially opposed ends and wherein said cutting path is defined in part by a pair of guide bars supported from said bed adjacent said axially opposed ends thereof.

10. A device as defined in claim 9 wherein said guide bars are supported from said bed by cantilever supports extending in laterally opposed directions at said axially opposed ends of said bed.

11. A device as defined in claim 9 wherein said fixed support point is disposed on one lateral side of said bed, and wherein there is provided a fixed cutting blade shield extending between said bed and one of said guide bars disposed on the same lateral side of said bed as said fixed support point to extend from adjacent said fixed support point to adjacent the forward end of said bed.

12. A device as defined in claim 11 wherein said fixed blade shield is secured to said bed and said one of said guide bars and serves to reinforce said one of said guide bars.

13. A device as defined in claim 11 including a second said fixed blade shield extending between said bed and the other of said guide bars adjacent the rearward end thereof.

14. A device as defined in claim 9 wherein each of said guide bars has a slotted opening therealong and wherein a plate is mounted in said slotted openings to be moveable along said guide bars, and wherein said plate and said slotted openings are shaped to prevent disengagement of said plate from said slotted openings in a lateral direction.

15. A device as defined in claim 1 wherein said cutting table is provided with protractor indicia along a side thereof adjacent to said fixed point.

16. A device as defined in claim 1 including measuring means extending along said table zeroed on said cutting path.

17. A device as defined in claim 1 wherein said cutting table is long and narrow and tapers towards one end thereof.

* * * * *